(12) United States Patent
Jo et al.

(10) Patent No.: US 12,409,831 B2
(45) Date of Patent: Sep. 9, 2025

(54) CONTROL DEVICE FOR A HYBRID ELECTRIC VEHICLE AND A CONTROL METHOD THEREOF

(71) Applicants: HYUNDAI MOTOR COMPANY, Seoul (KR); KIA CORPORATION, Seoul (KR)

(72) Inventors: Min Gyun Jo, Ansan-si (KR); Jae Young Choi, Seoul (KR); Gwang Il Du, Ansan-si (KR); Chun Hyuk Lee, Seongnam-si (KR); Hoon Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 88 days.

(21) Appl. No.: 18/241,340

(22) Filed: Sep. 1, 2023

(65) Prior Publication Data

US 2024/0278767 A1  Aug. 22, 2024

(30) Foreign Application Priority Data

Feb. 22, 2023 (KR) ........................ 10-2023-0023734

(51) Int. Cl.
*B60W 20/15* (2016.01)
*B60W 50/10* (2012.01)

(52) U.S. Cl.
CPC ............ *B60W 20/15* (2016.01); *B60W 50/10* (2013.01); *B60W 2510/244* (2013.01)

(58) Field of Classification Search
None
See application file for complete search history.

(56) References Cited

U.S. PATENT DOCUMENTS

| | | | |
|---|---|---|---|
| 5,892,346 A | 4/1999 | Moroto et al. | |
| 9,840,977 B1* | 12/2017 | Yurgil | F02D 41/042 |
| 10,272,909 B1* | 4/2019 | Melatti | B60W 10/30 |
| 2005/0193989 A1* | 9/2005 | Veenstra | F17C 5/007 |
| | | | 123/527 |
| 2008/0039261 A1* | 2/2008 | Cho | F16H 3/728 |
| | | | 475/5 |
| 2009/0062062 A1* | 3/2009 | Choi | B60W 10/08 |
| | | | 477/3 |

(Continued)

FOREIGN PATENT DOCUMENTS

| | | |
|---|---|---|
| JP | 2008128658 A | 6/2008 |
| JP | 2010173360 A | 8/2010 |

(Continued)

*Primary Examiner* — Wade Miles
*Assistant Examiner* — Arslan Azhar
(74) *Attorney, Agent, or Firm* — Lempia Summerfield Katz LLC (57) ABSTRACT

A control device for a hybrid electric vehicle includes an engine, a drive motor that drives the vehicle by assisting the engine, a battery that provides energy to the drive motor, and a processor. The processor may determine whether there is an attempt to fuel the vehicle. When it is determined that there is the attempt to fuel the vehicle, the processor may enter a refueling mode to maintain a state in which the engine is turned off, and when refueling is completed, the processor may release the refueling mode to turn on the engine according to an engine starting condition.

18 Claims, 8 Drawing Sheets

(56) References Cited

U.S. PATENT DOCUMENTS

| | | | |
|---|---|---|---|
| 2019/0193713 A1* | 6/2019 | Son | F02N 11/0803 |
| 2019/0219019 A1* | 7/2019 | Khafagy | B60W 30/18018 |
| 2020/0190889 A1 | 6/2020 | Jun et al. | |
| 2023/0278419 A1* | 9/2023 | Dudar | B60K 15/03504 137/12 |

FOREIGN PATENT DOCUMENTS

| | | |
|---|---|---|
| JP | 2012091542 A | 5/2012 |
| JP | 2012135135 A | 7/2012 |
| KR | 20210151028 A | 12/2021 |

* cited by examiner

CONTROL DEVICE FOR A HYBRID ELECTRIC VEHICLE AND A CONTROL METHOD THEREOF

CROSS-REFERENCE TO RELATED APPLICATION

This application claims the benefit of and priority to Korean Patent Application No. 10-2023-0023734, filed in the Korean Intellectual Property Office on Feb. 22, 2023, the entire contents of which are incorporated herein by reference.

TECHNICAL FIELD

The present disclosure relates to a control device for a hybrid electric vehicle and a control method thereof, and more particularly, to a technology for controlling ignition during a refueling process.

BACKGROUND

The statements in this section merely provide background information related to the present disclosure and may not constitute prior art.

A hybrid electric vehicle (HEV) generally refers to a vehicle that uses an engine and a drive motor as power sources of the vehicle. The hybrid electric vehicle not only has excellent fuel efficiency and power performance compared to vehicles equipped with only an internal combustion engine, but also has an advantage in reducing exhaust gas.

The hybrid electric vehicle may use both a drive motor and an engine or only a drive motor depending on a driving state of the vehicle, and a method of selectively using the drive motor and engine may not depend on a user input. For example, the hybrid electric vehicle may use a method in which an engine is turned off when traveling at a low speed or when stopped. Accordingly, when the hybrid electric vehicle is stopped, the engine is turned off without a user's operation, and accessory devices of the vehicle for user's convenience may be operated using battery power.

Even when the hybrid electric vehicle is stopped for refueling, the engine may be automatically turned off without a user's operation. However, there is a possibility that the engine may unintentionally start during refueling, which could pose a risk.

SUMMARY

The present disclosure has been made to solve the above-mentioned problems occurring in the prior art while advantages achieved by the prior art are maintained intact.

An aspect of the present disclosure provides a control device for a hybrid electric vehicle capable of preventing a fire from occurring during a refueling process and a control method thereof.

Another aspect of the present disclosure provides a control device for a hybrid electric vehicle capable of improving user convenience while preventing fire during a refueling process and a control method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a control device for a hybrid electric vehicle includes an engine, a drive motor that drives the vehicle by assisting the engine, a battery that provides energy to the drive motor, and a processor. The processor may determine whether there is an attempt to fuel the vehicle, when it is determined that there is the attempt to fuel the vehicle, enter a refueling mode to maintain a state in which the engine is turned off, and when refueling is completed, release the refueling mode to turn on the engine according to an engine starting condition.

According to an embodiment, the processor may determine whether there is the attempt to fuel the vehicle based on a gear of the vehicle being in a "P" position and a fuel intake being opened.

According to an embodiment, the processor may determine whether there is the attempt to fuel the vehicle when location information of the vehicle matches a gas station.

According to an embodiment, the processor may request a user to determine whether the vehicle enters the refueling mode when the location information does not match the gas station.

According to an embodiment, the processor may enter the refueling mode when a state of charge of the battery is greater than or equal to a preset threshold in a state where there is the attempt to fuel the vehicle.

According to an embodiment, the processor may control operation of an accessory device in the vehicle to reduce power consumption of the accessory device in the refueling mode.

According to an embodiment, the processor may skip monitoring of a driver's requested output in the refueling mode.

According to an embodiment, the processor may determine whether refueling is completed based on a change in amount of refueling.

According to an embodiment, the processor may determine whether a fuel intake is closed or the gear is released from the "P" position to determine whether refueling is completed.

According to an embodiment, the processor may identify a driver's requested output or a State of Charge of the battery as the engine starting condition.

According to an aspect of the present disclosure, A control method for a hybrid electric vehicle includes determining, by a processor, whether there is an attempt to fuel the vehicle, entering, by the processor, a refueling mode in which a state in which an engine is turned off is maintained when it is determined that there is the attempt to fuel the vehicle, and releasing, by the processor, the refueling mode to turn on the engine according to an engine starting condition based on refueling being completed.

According to an embodiment, the determining of whether there is an attempt to fuel the vehicle may include determining whether a gear of the vehicle is in a "P" position, and determining whether a fuel intake is opened.

According to an embodiment, the determining of whether there is an attempt to fuel the vehicle may further include determining whether location information of the vehicle matches a gas station.

According to an embodiment, the entering to the refueling mode may include requesting a user to determine whether the vehicle enters the refueling mode when the location information does not match the gas station.

According to an embodiment, the entering to the refueling mode may further include determining whether a state of charge of the battery is greater than or equal to a preset threshold.

According to an embodiment, the entering to the refueling mode may include controlling operation of an accessory device in the vehicle to reduce power consumption of the accessory device in the refueling mode.

According to an embodiment, the entering to the refueling mode may include skipping monitoring of a driver's requested output in the refueling mode.

According to an embodiment, the determining of whether refueling is completed may include monitoring a change in amount of refueling.

According to an embodiment, the determining of whether refueling is completed may include determining whether a fuel intake is closed or the gear is released from the "P" position.

According to an embodiment, the turning on of the engine according to the engine starting condition may include identifying a driver's requested output or a State of Charge of the battery.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, some embodiments of the present disclosure are described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions have been ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1 to 8.

Figure 1:
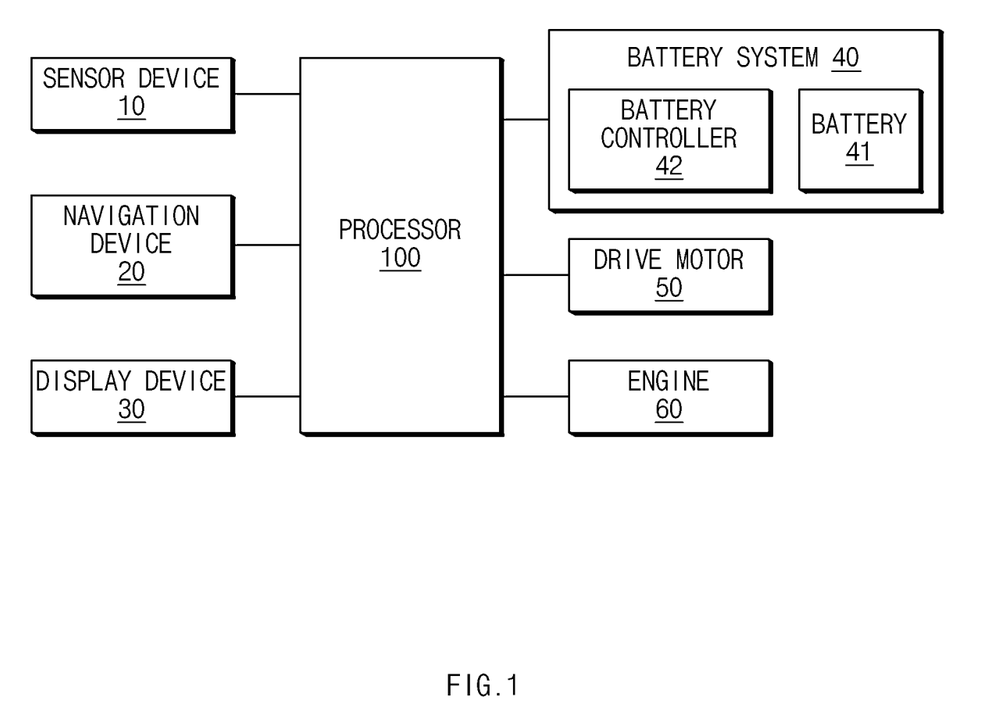
FIG. 1 is a block diagram illustrating a configuration of a control device for a hybrid electric vehicle according to an embodiment of the present disclosure.

FIG. 1 is a block diagram illustrating a configuration of a control device for a hybrid electric vehicle according to an embodiment of the present disclosure. A vehicle including the control device shown in FIG. 1 may be a hybrid electric vehicle using a drive motor and an engine as power sources.

Referring to FIG. 1, a control device for a hybrid electric vehicle according to an embodiment of the present disclosure may include a sensor device 10, a navigation device 20, a display device 30, a battery system 40, a drive motor 50, an engine 60, and a processor 100.

The sensor device 10 may include at least one sensor installed in the vehicle, and acquire driving state information of the vehicle through the sensor. For example, the sensor device 10 may be used to generate a speed control command for shifting of the vehicle. The sensor device 10 may include a brake-pedal position sensor (BPS) and an accelerator pedal position sensor (APS).

In more detail, the brake pedal position sensor may output a BPS signal according to the degree of depression on a brake pedal provided in the vehicle. As an example, the BPS signal may output data of zero (0) to 100 according to the degree of depression on the brake pedal. A value of zero (0) may indicate that the brake pedal is not depressed, and a value of 100 may indicate that the brake pedal is maximally (e.g., fully) depressed.

The accelerator pedal position sensor may output an APS signal according to the degree of depression on an accelerator pedal provided in the vehicle. As an example, the APS signal may generate values from zero (0) to 100 according to the degree of depression on the accelerator pedal. A value of zero (0) may indicate that the brake pedal is not depressed, and a value of 100 may indicate that the accelerator pedal is maximally or fully depressed.

In addition, the sensor device 10 may include a sensor for checking the refueling amount of the vehicle.

In addition, the sensor device 10 may include a sensor for checking opening and closing of a fuel intake.

In addition, the sensor device 10 may further include at least one or more of a camera for detecting objects external to the vehicle, in particular, vehicles located in front or behind the vehicle. The sensor device 10 may further include a RADAR (Radio Detection and Ranging), a LIDAR (Light Imaging Detection and Ranging), an ultrasonic sensor, or an infrared sensor.

The camera may be positioned at an appropriate location outside the vehicle, for example, in the front portion, rear portion, right side mirror, or left side mirror of the vehicle to obtain an image outside the vehicle. The camera may be a mono camera, a stereo camera, an Around View Monitoring (AVM) camera, or a 360-degree camera.

The camera may be placed close to the front windshield in the cabin of the vehicle, and around the front bumper or radiator grill to obtain an image in front of the vehicle.

The camera may be positioned close to at least one of the side windows in the cabin of the vehicle to obtain an image on the side of the vehicle. Also, the camera may be positioned around a fender or door.

The RADAR may include an electromagnetic wave transmission module and a reception module. The RADAR may be implemented in a pulse radar method or a continuous wave radar method in terms of the radio wave emission principle. The RADAR may be implemented in a frequency modulated continuous wave (FMCW) scheme or a frequency shift keying (FSK) scheme according to a signal waveform among continuous wave radar methods. The RADAR may detect an object based on a Time of Flight (TOF) method or a phase-shift method using electromagnetic waves as a medium, and detect a position of the detected object, a distance to the detected object, and a relative speed with respect to the detected object.

The LIDAR may include a laser transmission module and a reception module. The LIDAR may be implemented in a Time of Flight (TOF) method or a phase-shift method. The LIDAR may be exposed to the outside of the vehicle to detect an object located in front, rear or side of the vehicle.

The navigation device 20 may detect current location information of the vehicle through a global positioning system (GPS) sensor or the like. The navigation device 20 may search for a movement route from a current location of the vehicle to a destination based on destination information input by a vehicle user. The navigation device 20 may store map data used for route search in an internal memory for route search. In the map data used for route search, each road may be identified as at least one road section or link, and the map data may include road information for each road section. In addition, the road information may include road types (free roads, expressways, or the like), road attributes (toll gates, intersections, or the like), speed limits, gradient information, and the like for a corresponding road section. The map data may further include point of interest (POI) information including location information of major restaurants, gas stations, electric vehicle charging stations or the like. The navigation device 20 may receive traffic information from a traffic information providing server connected thereto using a wireless communication method for route search. Here, the traffic information may include a degree of congestion and an average vehicle speed of each road section (hereinafter, referred to as "road average vehicle speed") and the like. The navigation device 20 may search for a movement route to a destination using the above-described map data and traffic information. Then, the navigation device 20 may display route guidance information related to a found movement route through the display device 30.

The display device 30 may display various types of information and data processed by the processor 100 or other accessory devices. For example, the display device 30 may display route guidance information for the movement route found through the navigation device 20. Also, the display device 30 may display a remaining State of Charge ("SOC") of a battery 41. In addition, the display device 30 may be an AVN (Audio, Video, Navigation), cluster, HUD (Head Up Display), or the like of the vehicle. Also, the display device 30 may be coupled to a touch panel to receive a user input.

The battery system 40 may include the battery 41 providing electrical energy to the drive motor 50 of the vehicle, and a battery management system (BMS) 42 for managing the battery 41. The BMS 42 may control charging and discharging of the battery 41, cell balancing, and the like. The BMS 42 may identify a remaining SOC of the battery 41 based on battery state information (voltage, current, temperature, or the like) detected from the battery 41.

The processor 100 may determine whether there is an attempt to fuel the vehicle. The attempt to fuel the vehicle may be interpreted as including when to attempt refueling the vehicle and a state in which the vehicle is being fueled.

According to an embodiment, the processor 100 may determine that refueling the vehicle is being attempted when a gear of the vehicle is in the "P" position and a fuel intake is opened.

In addition, the processor 100 may determine whether location information of vehicle matches a gas station in order to determine a refueling attempt. The processor 100 may determine whether the vehicle is located in the gas station based on location information provided from the navigation device 20 or the like.

According to an embodiment, the processor 100 may set a associated with determination of plurality of conditions refueling attempt. When a certain number or more of the conditions associated with the determination of refueling attempt are identified, the processor 100 may determine that a refueling attempt occurs. For example, the conditions associated with the determination of refueling attempt may include an increase in refueling amount, a state of the vehicle gear in "P" position, an open fuel intake, and a location of the vehicle in a gas station.

According to an embodiment, the processor 100 may determine whether there is a refueling attempt by being subjected to artificial intelligence learning for a plurality of conditions associated with the determination of refueling attempt. In addition, a user's refueling pattern may be affected by time and weather conditions so that time and weather information may also be included as input values for artificial intelligence learning.

When a refueling attempt is determined, the processor 100 may enter a refueling mode and keep the engine 60 turned off.

The processor 100 may further identify an additional condition for entering the refueling mode after determining the refueling attempt. For example, the processor 100 may identify a state of charge (SOC) of the battery 41 and enter the refueling mode when the SOC of the battery 41 is equal to or greater than a preset threshold. Alternatively, the processor may determine whether the processor 100 is in a normal operating state and enter the refueling mode when the processor 100 is in the normal operating state.

In the refueling mode, the processor 100 may skip an operation of monitoring a driver's requested output. Therefore, in the refueling mode, the processor 100 may not turn on the engine 60 regardless of the driver's requested output.

Also, in the refueling mode, the processor 100 may control operations of accessory devices in the vehicle to reduce power consumption of the accessory devices.

The processor 100 may release the refueling mode based on refueling completion and turn on the engine 60 according to an engine starting condition.

The processor 100 may determine whether refueling is completed based on a state in which the refueling amount is constantly increased and then stopped, the fuel intake is closed, and the gear is released from the "P" position.

Figure 2:
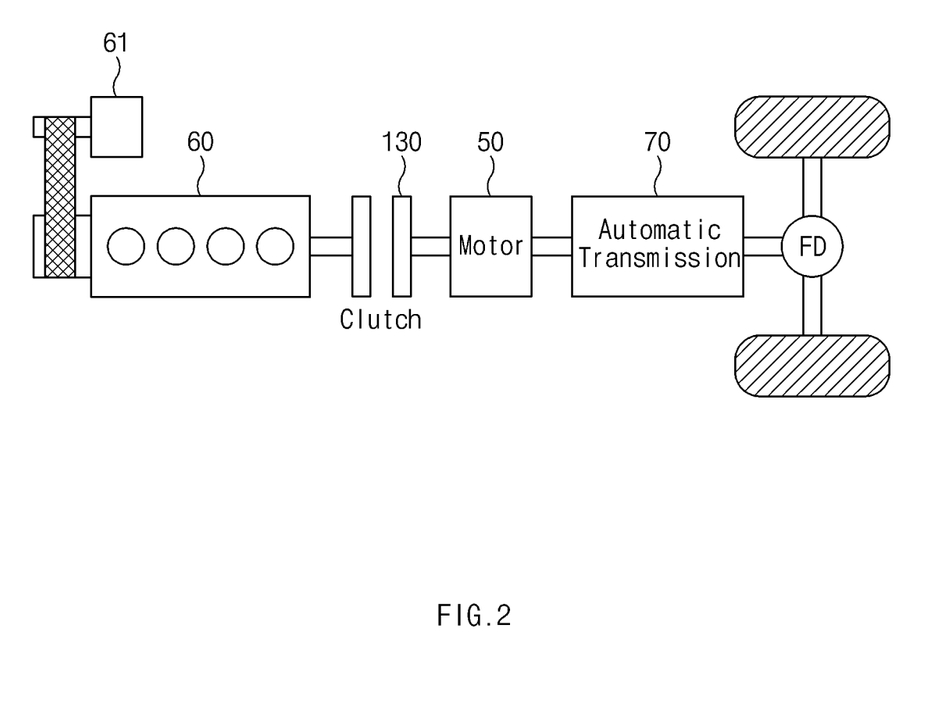
FIG. 2 is a diagram showing a structure of a powertrain including a drive motor and an engine.

FIG. 2 is a diagram showing a structure of a powertrain including the drive motor and the engine shown in FIG. 1.

Referring to FIG. 2, a powertrain may be a parallel type hybrid system in which the drive motor 50 and clutch 130 are mounted between the internal combustion engine 60 and an automatic transmission 70.

The clutch 130 may be opened according to an APS signal from an accelerator pedal sensor after a vehicle is started. In a state where the clutch 130 are opened, the drive motor 50 may be driven using the power of the battery 41, so that the wheels of the vehicle may move through the automatic transmission 70 and a final reduction gear FD.

Subsequently, when the driver's requested output is increased, an auxiliary motor 61 may be operated and the engine 60 may be driven.

When a difference in rotation speed between the engine 60 and the drive motor 50 is within a certain range, the engine 60 and the drive motor 50 may be driven together in such a way that the clutch 130 are engaged with each other.

Also, when a preset condition related to engine OFF, such as vehicle deceleration, is satisfied, the clutch 130 may be opened and the engine 60 may be stopped. When the engine 60 is stopped, regenerative braking may be performed to charge the battery 41 through the drive motor 50 using the driving force of the wheels. The auxiliary motor 61 may operate as a start motor when the engine 60 is started and operate as a generator when the rotational energy of the engine is recovered after the engine 60 is started or turned off, thereby being referred to as a hybrid starter generator (HSG).

Figure 3:
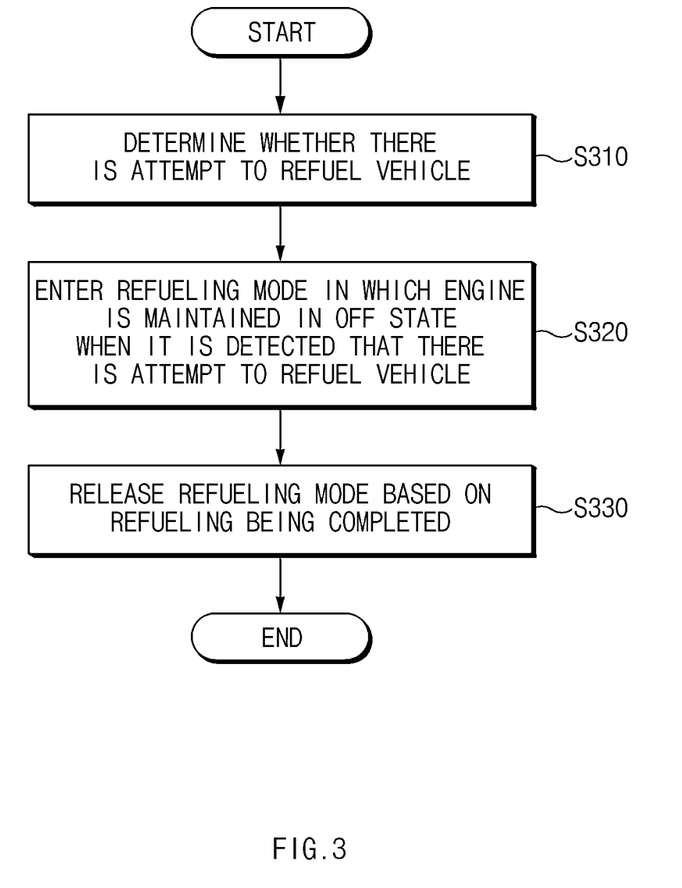
FIG. 3 is a flowchart for describing a method for controlling a hybrid electric vehicle according to an embodiment of the present disclosure.

FIG. 3 is a flowchart for describing a control method for a hybrid electric vehicle according to an embodiment of the present disclosure. Hereinafter, a control method for a hybrid electric vehicle according to an embodiment of the present disclosure is described in detail with reference to FIG. 3. It can be understood that the processes shown in FIG. 3 are controlled by the processor 100 shown in FIG. 1.

In operation S310, the processor 100 may determine whether there is an attempt to fuel the vehicle.

The processor 100 may determine there is an attempt to fuel the vehicle based on a change in amount of refueling, a vehicle gear, whether a fuel intake is opened, a battery SOC, and whether the processor 100 is abnormal.

For example, the processor 100 may determine that there is an attempt to fuel the vehicle when the gear of the vehicle is in the "P" position and the fuel intake is opened.

Also, the processor 100 may determine whether location information of the vehicle matches a location of a gas station.

In operation S320, the processor 100 may enter a refueling mode when it is determined that there is an attempt to fuel the vehicle.

Operation modes according to an embodiment of the present disclosure may be classified into a normal mode and a refueling mode, which may be for distinguishing a method of controlling engine starting.

In the normal mode, in a state in which the engine 60 of the vehicle is turned off, an engine starting condition may be identified and the engine 60 of the vehicle may be turned on when the engine starting condition is satisfied. For example, when the remaining SOC of the battery 41 is less than a preset threshold, the processor 100 may start the engine 60 to use the power of the engine 60. Alternatively, when the driver's requested output is equal to or greater than the preset threshold power, the processor 100 may start the engine 60 to use the power of the engine 60. In this way, even when the user does not input an input to start the engine 60 in a state in which the engine 60 is turned off and the power of the battery 41 is used alone, the processor 100 may turn on the engine 60 according to preset engine starting conditions.

The refueling mode may be an operation mode that suppresses engine starting while the vehicle is refueling. That is, during the refueling mode, the engine may be maintained in an off state regardless of the engine starting conditions. Accordingly, it is possible to prevent the risk of fire from occurring in advance when the engine 60 of the vehicle is started in the refueling mode. In addition, the refueling mode may be maintained regardless of whether the battery 41 operates. That is, the battery 41 is able to operate in the refueling mode, so that operations of multimedia devices in the vehicle or accessories for user convenience may be maintained in the refueling mode.

In operation S330, the processor 100 may release the refueling mode based on refueling completion and turn on the engine according to the engine starting conditions.

When refueling has been completed, the processor 100 may identify the engine starting conditions, release the refueling mode, and enter a normal mode. In the normal mode, the engine 60 is turned on according to engine starting conditions to prevent the battery 41 from being discharged or lacking in power.

Hereinafter, a specific embodiment of each of the processes shown in FIG. 3 is described.

Figure 4:
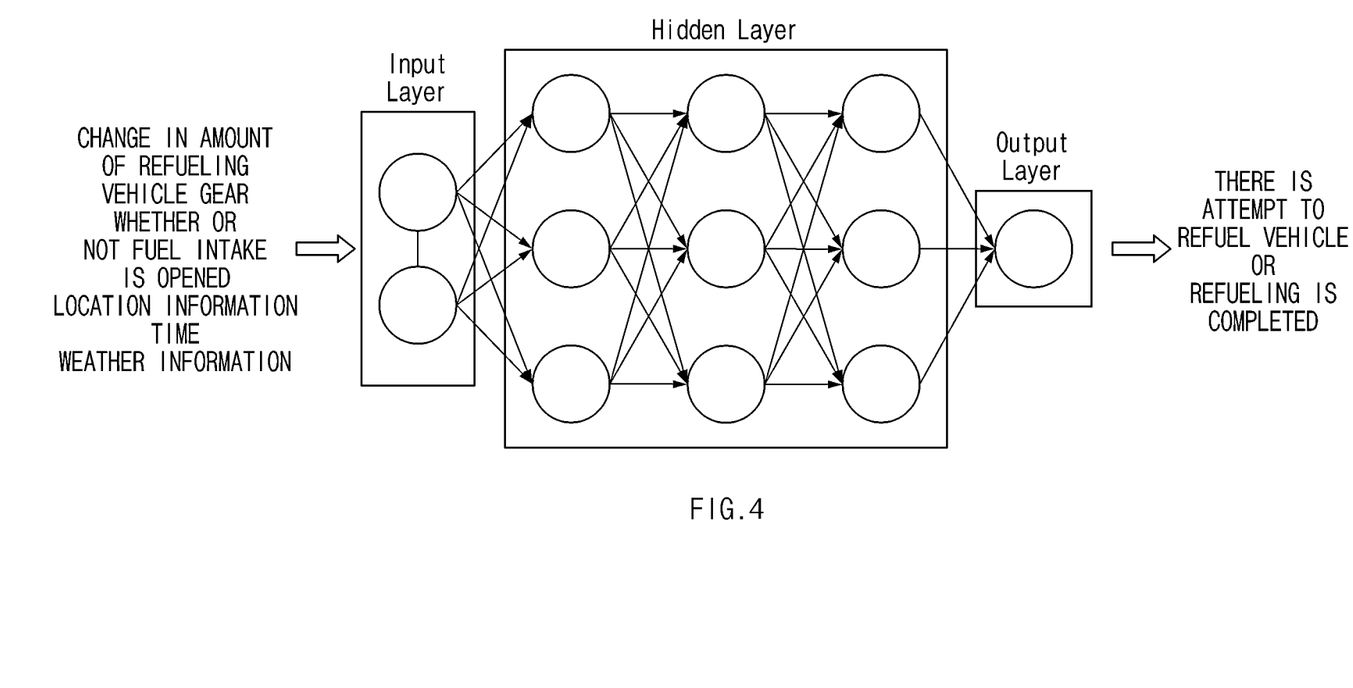
FIG. 4 is a schematic view of an Artificial Neural Network (ANN) for determining refueling attempt or refueling completion according to an embodiment of the present disclosure.

FIG. 4 is a schematic view of an Artificial Neural Network (ANN) for determining refueling attempt or refueling completion according to an embodiment of the present disclosure.

Referring to FIG. 4, the processor 100 may use the artificial neural network shown in FIG. 4 to determine whether the vehicle is in a refueling attempt state or a refueling completion state. In this specification, the refueling attempt state may be interpreted as a term including a state in which a vehicle is refueling.

The artificial neural network may be stored in the processor 100 or a memory. The artificial neural network may be obtained by computationally modeling connections of human neurons, and may include an input layer, a hidden layer, and an output layer.

The input layer may multiply input data by a weight matrix and provide the input data to the hidden layer. The input data may be variables used to determine whether there is the attempt to fuel the vehicle or refueling is completed. The input data may include at least one of a change in amount of refueling, a vehicle gear, whether or not a fuel intake is opened, location information, time, and weather information.

The hidden layer may process the input data based on an activation function. In addition, the hidden layer may multiply the processed input data by a new weight matrix and pass the input data to the output layer.

The output layer may output a result obtained by reflecting an activation function for output. The output layer may output a result of determination of whether there is the attempt to fuel the vehicle or refueling is completed as an output value.

Figure 5:
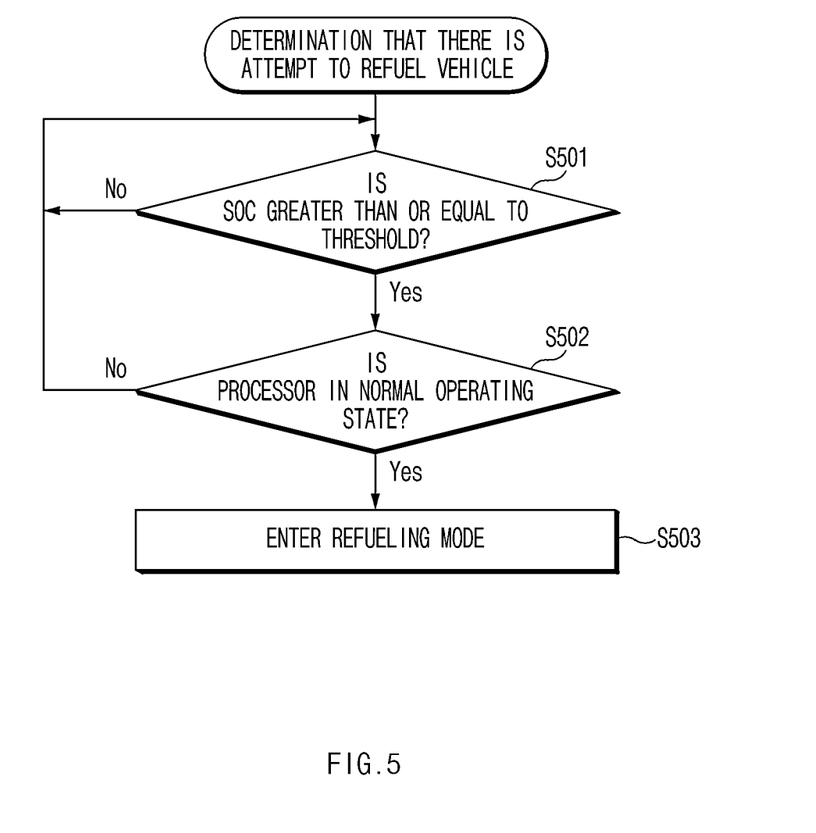
FIG. 5 is a flowchart for describing a process for identifying an additional condition for determining whether to enter a refueling mode according to an embodiment of the present disclosure.

FIG. 5 is a flowchart for describing a control method for a hybrid electric vehicle according to another embodiment of the present disclosure. FIG. 5 illustrates a process for identifying an additional condition for determining to enter a refueling mode after it is determined that there is the attempt to fuel the vehicle.

Referring to FIG. 5, a control method for a hybrid electric vehicle according to another embodiment of the present disclosure is described below.

An operation S501 may be performed after it is determined that there is the attempt to fuel the vehicle. In operation S501, the processor 100 may identify a SOC of the battery 41 and determine whether the SOC is greater than or equal to a threshold value.

When the SOC of the battery 41 is greater than or equal to the threshold value, the processor 100 may determine whether an operating state of the processor 100 itself is in a normal operating state in operation S502.

In operation S503, when the processor 100 is in a normal operating state, the processor 100 may enter a refueling mode. That is, the processor 100 may enter the refueling mode when the SOC of the battery 41 is greater than or equal to the threshold value and the processor 100 is in a normal operating state when it is determined that there is the attempt to fuel the vehicle.

Figure 6:
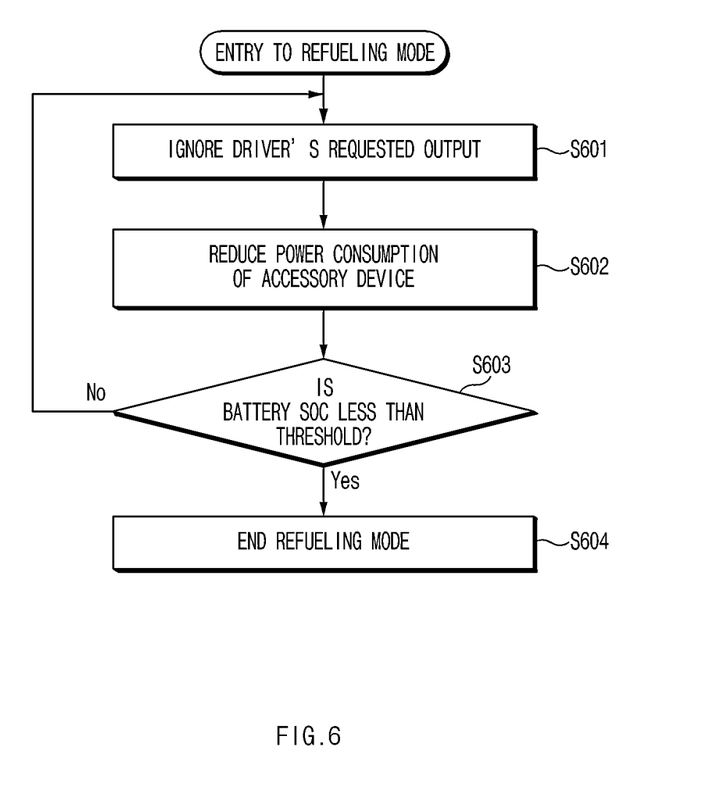
FIG. 6 is a flowchart for describing principal operation of a processor in a refueling mode according to an embodiment of the present disclosure.

FIG. 6 is a flowchart for describing a control method for a hybrid electric vehicle according to another embodiment of the present disclosure. FIG. 6 describes the principal operation of a processor in a refueling mode.

Referring to FIG. 6, operation in the refueling mode according to an embodiment of the present disclosure is described below.

In operation S601, the processor 100 may ignore a driver's requested output.

The driver's requested output may mean energy required to drive the vehicle and may be proportional to the magnitude of an APS signal.

The processor 100 may suppress operation of starting the engine 60 according to the driver's requested output because the requested output is not monitored during the refueling mode.

In operation S602, the processor 100 may reduce the power consumption of accessory devices.

The accessory devices may refer to devices using the power of the battery 41, and may include, for example, the navigation device 20 and the display device 30, as well as an air conditioner, an audio system, an electric seat, and the like.

The processor 100 may lower screen brightness of the navigation device 20 and the display device 30 and lower the volume of the audio system to reduce power consumption of the accessory devices. Alternatively, the processor 100 may lower the intensity of the air conditioner and suppress the operation of the electric seat to reduce the power consumption of the accessory devices.

In operation S603, the processor 100 may monitor the SOC of the battery 41 and determine whether the SOC of the battery 41 is less than a preset threshold.

In operation S603, when the SOC of the battery 41 is less than the threshold value, the processor 100 may terminate the refueling mode. When the refueling mode is terminated in operation S604, the processor 100 may inform the fact that the refueling mode is terminated due to insufficient SOC of the battery through the display device 30, a speaker, or the like.

Figure 7:
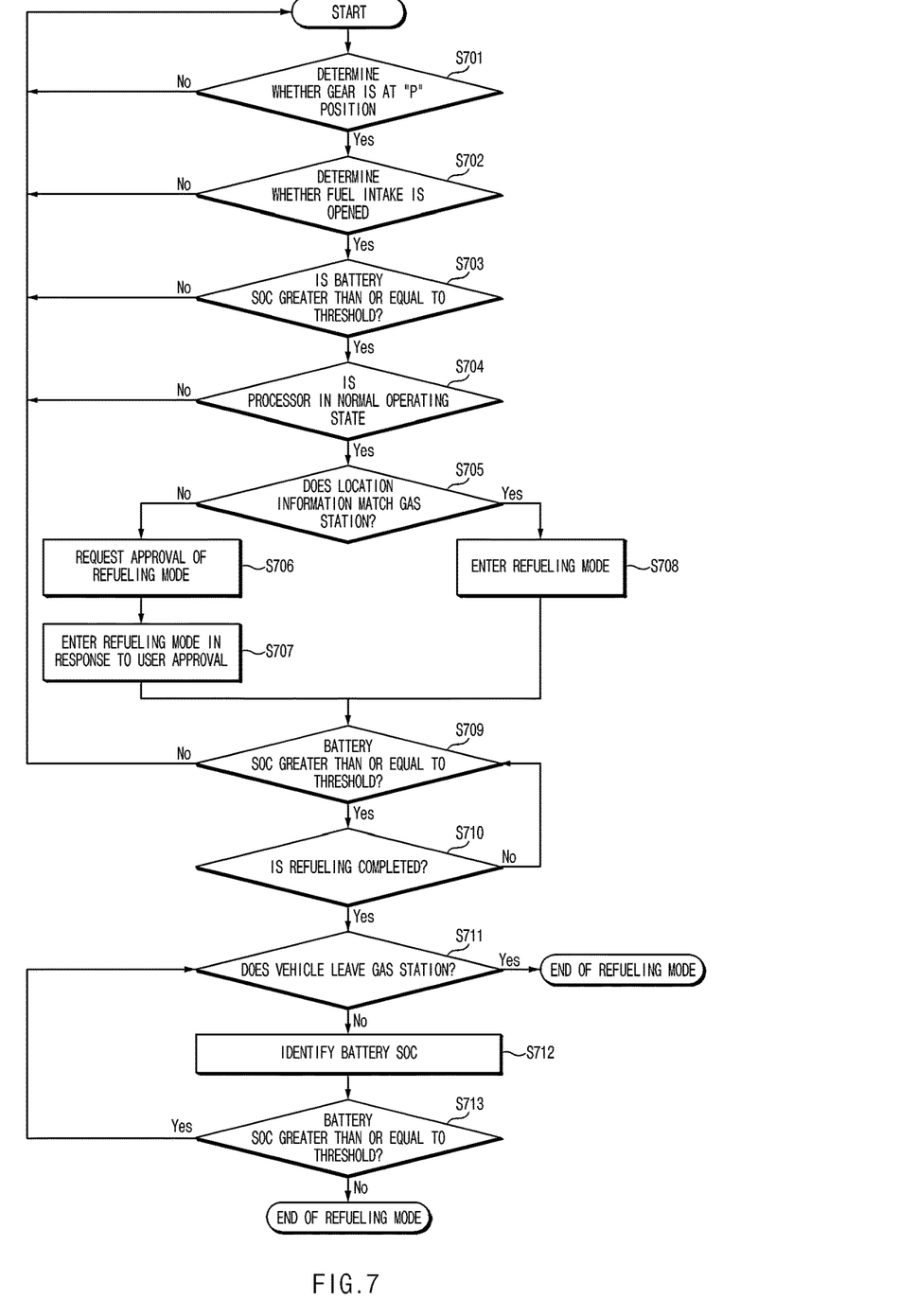
FIG. 7 is a flowchart for describing a method for controlling a hybrid electric vehicle according to an embodiment of the present disclosure.

FIG. 7 is a flowchart for describing a control method for a hybrid electric vehicle according to still another embodiment of the present disclosure. Referring to FIG. 7, a control method for a hybrid electric vehicle according to still another embodiment of the present disclosure is described below.

In operation S701, the processor 100 may identify whether the gear of a vehicle is in the "P" position.

In operation S702, when the gear of the vehicle is in the "P" position, the processor 100 may determine whether a fuel intake is opened. To this end, the processor 100 may receive information from a sensor that determines whether the fuel intake is opened. Alternatively, when a user input for opening the fuel intake is detected, the processor 100 may determine that the fuel intake is opened.

In operation S703, when the fuel intake is opened, the processor 100 may determine whether the SOC of the battery is greater than or equal to a threshold value.

In operation S704, when the SOC of the battery 41 is greater than or equal to a threshold value, the processor 100 may determine whether the processor 100 is in a normal operating state.

In operation S705, when the processor 100 is in a normal operating state, the processor 100 may determine whether location information of the vehicle matches a location of a gas station.

In operation S706, when the location information of the vehicle does not match the location of a gas station, the processor 100 may request a user to approve the refueling mode.

To this end, the processor 100 may display a message for requesting the user to determine whether the vehicle enters the refueling mode through the display device 30.

In operation S707, the processor 100 may enter a refueling mode in response to user approval. The user approval may be identified through the display device 30 or a separate input device.

Also, when the processor 100 does not receive a request for rejecting a refueling mode from the user, the processor 100 may enter the refueling mode. For example, the processor 100 may determine that the user approval has been made implicitly when no user input is identified within a predetermined period of time after a message for requesting the user to determine whether to enter the refueling mode is displayed to the user in operation S706. This may be based on a determination that only the facts identified in operations S701 to S704 are sufficient to enter the refueling mode.

In operation S708, when the location information of the vehicle matches a location of a gas station, the processor 100 may enter the refueling mode.

In operation S709, the processor 100 may monitor the SOC of the battery 41 when entering the refueling mode, and determine whether the SOC of the battery 41 is equal to or greater than a threshold value.

In operation S710, when the SOC of the battery 41 is greater than or equal to the threshold value, the processor 100 may determine whether refueling has been completed.

In operation S711, when refueling completion is identified, the processor 100 may determine whether the vehicle has left the gas station. To this end, the processor 100 may identify the location information of the vehicle.

In operations S712 and S713, when the vehicle is located in the gas station, the processor 100 may identify the SOC of the battery 41, and when the SOC of the battery 41 is greater than or equal to the threshold value, monitor the location information of the vehicle to repeatedly perform operation S711.

Figure 8:
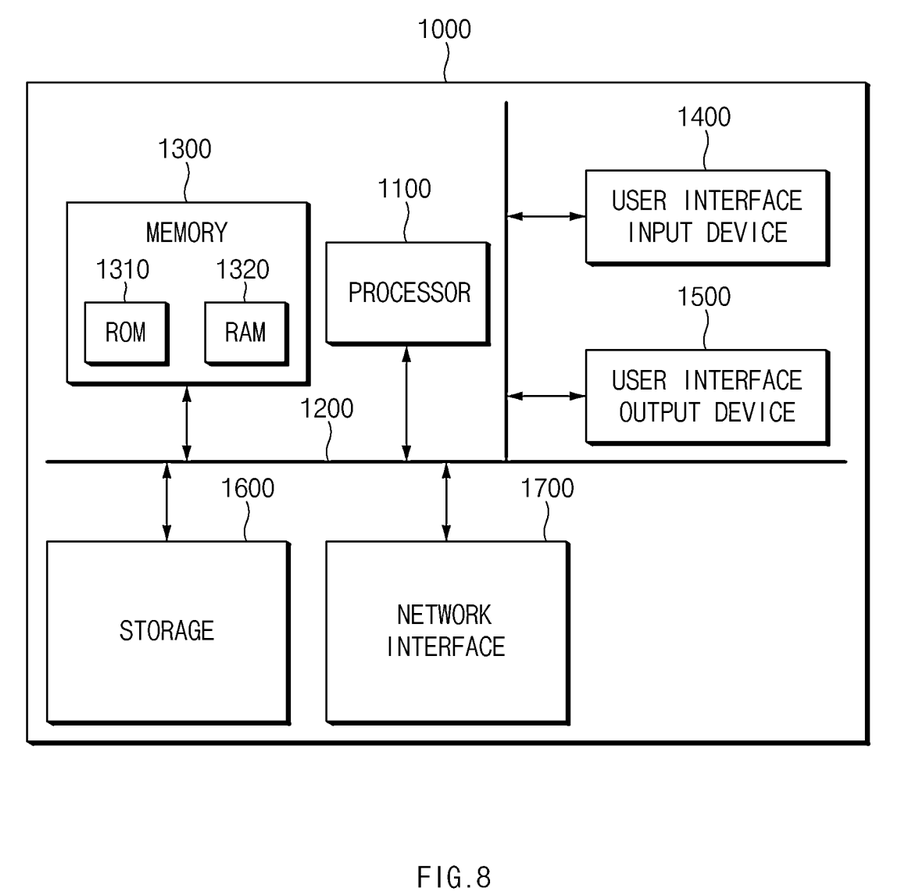
FIG. 8 is a diagram illustrating a computing system according to an embodiment of the present disclosure.

FIG. 8 illustrates a computing system according to an embodiment of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those having ordinary skill in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

According to the embodiments of the present disclosure, it is possible to maintain the engine stably in the off state without a user's operation by determining whether there is an attempt to fuel a vehicle or whether refueling is being performed and preventing the engine from being turned on.

According to the embodiments of the present disclosure, it is possible to reduce a possibility that an engine is turned on due to battery consumption by controlling the accessory device to reduce the power consumption of the accessory device.

In addition, various effects identified directly or indirectly through the disclosure may be provided.

Hereinabove, although the present disclosure has been described with reference to the embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. A control device for a hybrid electric vehicle, comprising:
    an engine;
    a drive motor configured to drive the vehicle by assisting the engine;
    a battery configured to provide energy to the drive motor; and
    a processor configured to:
        determine whether there is an attempt to fuel the vehicle,
        enter a refueling mode to maintain a state in which the engine is turned off, based on determination that there is the attempt to fuel the vehicle,
        skip or otherwise refrain from monitoring of a driver's requested output in the refueling mode, and
        release the refueling mode based on determination that refueling is completed to turn on the engine according to an engine starting condition.

2. The control device of claim 1, wherein the processor is configured to determine whether there is the attempt to fuel the vehicle based on a gear of the vehicle being in a "P" position and a fuel intake being opened.

3. The control device of claim 2, wherein the processor is configured to determine whether there is the attempt to fuel the vehicle based on determination that location information of the vehicle matches a gas station.

4. The control device of claim 3, wherein the processor is configured to request a user to determine whether the vehicle enters the refueling mode based on determination that the location information does not match the gas station.

5. The control device of claim 1, wherein the processor is configured to enter the refueling mode based on determination that a state of charge of the battery is greater than or equal to a preset threshold in a state where there is the attempt to fuel the vehicle.

6. The control device of claim 1, wherein the processor is configured to control operation of an accessory device in the vehicle to reduce power consumption of the accessory device in the refueling mode.

7. The control device of claim 1, wherein the processor is configured to determine whether refueling is completed based on a change in amount of refueling.

8. The control device of claim 7, wherein the processor is configured to determine whether a fuel intake is closed or a gear of the vehicle is released from a "P" position to determine whether refueling is completed.

9. The control device of claim 1, wherein the processor is configured to confirm the driver's requested output or a State of Charge of the battery as the engine starting condition.

10. A control method for a hybrid electric vehicle, comprising:
    determining, by a processor, whether there is an attempt to fuel the vehicle;
    entering, by the processor, a refueling mode in which a state in which an engine is turned off and maintained based on determination that there is the attempt to fuel the vehicle;
    skipping or otherwise refraining, by the processor, from monitoring of a driver's requested output in the refueling mode; and
    releasing, by the processor, the refueling mode to turn on the engine according to an engine starting condition based on refueling being completed.

11. The control method of claim 10, wherein determining whether there is an attempt to fuel the vehicle includes
    determining whether a gear of the vehicle is in a "P" position, and
    determining whether a fuel intake of the vehicle is opened.

12. The control method of claim 11, wherein determining whether there is an attempt to fuel the vehicle further includes determining whether location information of the vehicle matches a location of a gas station.

13. The control method of claim 12, wherein the entering to the refueling mode includes requesting a user to determine whether the vehicle enters the refueling mode based on determination that the location information does not match the location of a gas station.

14. The control method of claim 10, wherein entering to the refueling mode further includes determining whether a state of charge of a battery is greater than or equal to a preset threshold.

15. The control method of claim 10, wherein entering to the refueling mode includes controlling operation of an accessory device in the vehicle to reduce power consumption of the accessory device in the refueling mode.

16. The control method of claim 10, wherein determining whether refueling is completed includes monitoring a change in an amount of refueling.

17. The control method of claim 16, wherein determining whether refueling is completed includes determining whether a fuel intake is closed or a gear of the vehicle is released from a "P" position.

18. The control method of claim 10, wherein turning on of the engine according to the engine starting condition includes identifying the driver's requested output or a State of Charge of the battery.

* * * * *